United States Patent
Sears et al.

[11] Patent Number: 5,953,491
[45] Date of Patent: Sep. 14, 1999

[54] CONTROL SYSTEM FOR A PERMANENT MAGNET MOTOR

[75] Inventors: Jerome Sears, Wyckoff; Walter Parfomak, Wallington; Walter J. Kluss, Clifton, all of N.J.

[73] Assignee: AlliedSignal Inc., Morristown, N.J.

[21] Appl. No.: 08/940,662

[22] Filed: Sep. 29, 1997

[51] Int. Cl.[6] .................................................. H02P 5/17
[52] U.S. Cl. ..................... 388/811; 318/798; 318/800; 318/811; 318/599; 388/928
[58] Field of Search .................... 318/798–811, 599; 388/928.1, 811

[56] References Cited

U.S. PATENT DOCUMENTS

| | | | |
|---|---|---|---|
| 3,794,895 | 2/1974 | Coupin et al. | 318/254 |
| 4,368,411 | 1/1983 | Kidd | 318/254 |
| 4,418,307 | 11/1983 | Hoffmann et al. | 318/721 |
| 4,455,513 | 6/1984 | Fulton et al. | 318/138 |
| 4,614,901 | 9/1986 | Kullman et al. | 318/599 X |
| 4,710,686 | 12/1987 | Guzik | 318/599 X |
| 4,839,754 | 6/1989 | Gami et al. | 318/254 X |
| 5,023,527 | 6/1991 | Erdman et al. | 318/254 X |
| 5,637,971 | 6/1997 | Pratt | 318/138 X |

*Primary Examiner*—Karen Masih
*Attorney, Agent, or Firm*—Loria B. Yeadon

[57] ABSTRACT

The speed of a rotor in a two-winding, permanent magnet motor can be accurately controlled with a dual-polarity pulse width modulation drive signal. The phase back emf signal generated in the non-excited winding is compared against the phase of a command signal and the results of the comparison are used to vary the duty cycle of the drive signal.

5 Claims, 4 Drawing Sheets

CONTROL SYSTEM FOR A PERMANENT MAGNET MOTOR

BACKGROUND OF THE INVENTION

The arrangements discussed here concern motors of the type disclosed in U.S. Pat. No. 4,673,849, issued on Jun. 16, 1987, to Sears et al. for a Permanent Magnet Motor Closed Loop Restarting System; and U.S. Pat. No. 4,818,922, issued on Apr. 4, 1989, to Sears et al. for Optical Commutation for Permanent Magnet Motors; both incorporated by reference herein.

Accurate speed control is a desirable element in the operation of permanent magnet motors, as for example in gyroscopic applications. By controlling the signal applied to the drive winding (the $\phi A$ winding) of a motor, the speed of the rotor can be controlled. However, the drive signal is not a constant and must be varied to account for changes in drag due to windage, friction, and other factors to avoid over- and underspeed conditions.

A suitable control signal can be applied using dual-polarity pulse width modulation. The phase of the back emf generated in the motor's sensor winding (the $\phi B$ winding) is compared against the phase of the command signal. In turn, a variable duty-cycle pulse-width modulation signal is generated, where the duty cycle is proportional to the phase difference.

BRIEF DESCRIPTION OF DRAWINGS

A more complete understanding of the present invention, as well as other objects and advantages thereof not enumerated herein, will become apparent upon consideration of the following detailed description and the accompanying drawings, wherein.

DESCRIPTION OF THE INVENTION

Figure 1:
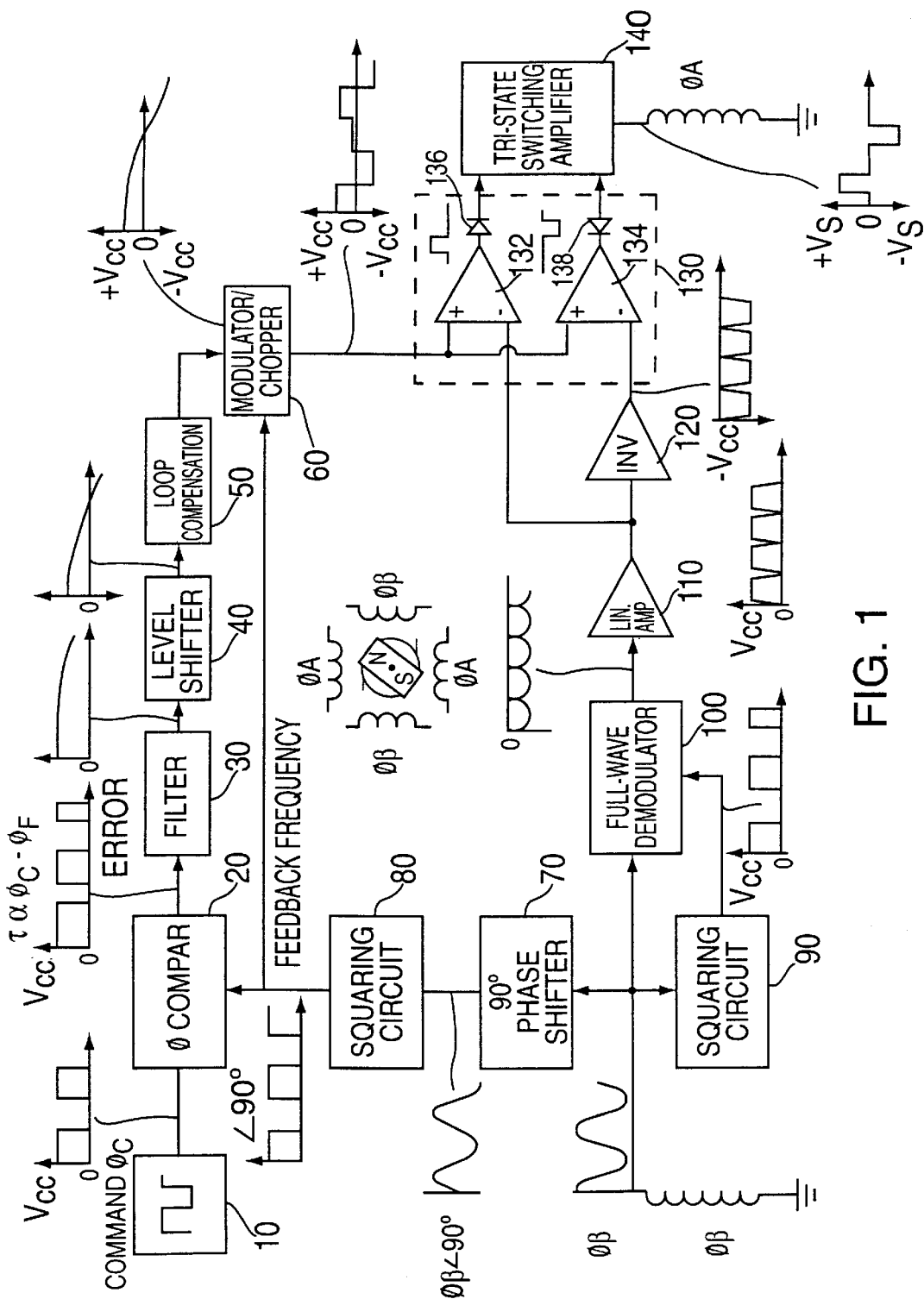
FIG. 1 is a functional block diagram of a pulse-width modulated permanent magnet motor circuit.
Figure 3A:
Figure 3B:
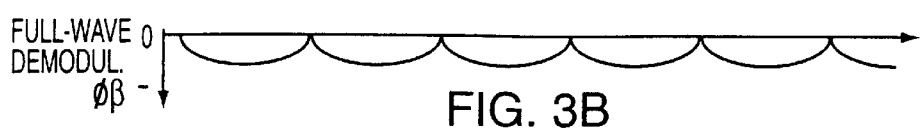
Figure 3C:
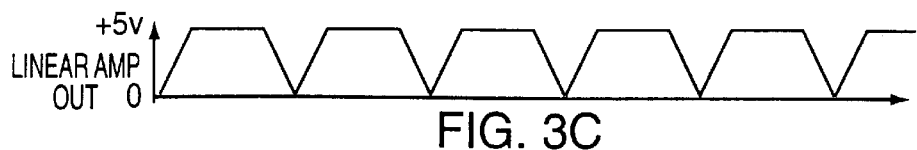
Figure 3D:
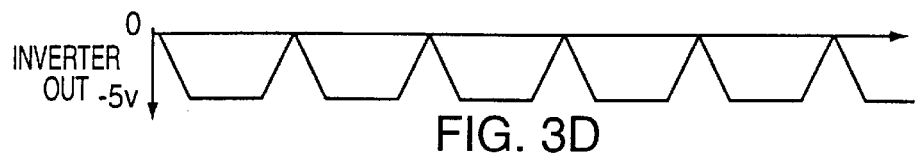
Figure 3E:
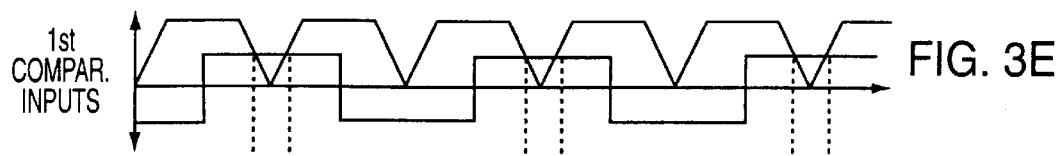
Figure 3F:
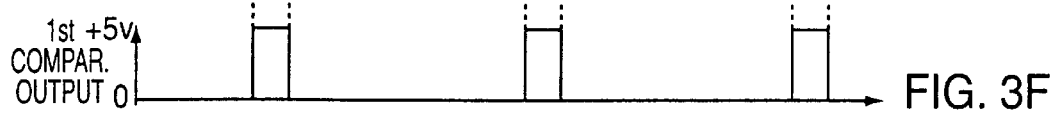
Figure 3G:
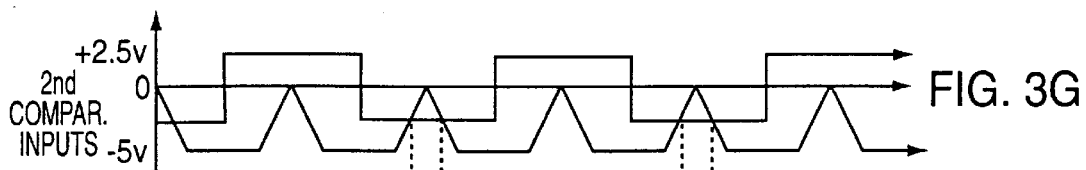
Figure 3H:
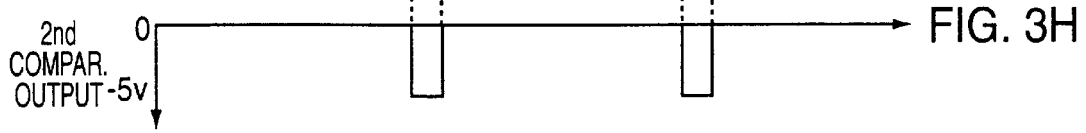
Figure 3I:
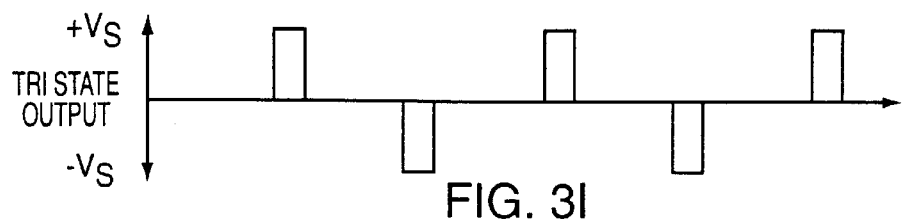
Figure 4:
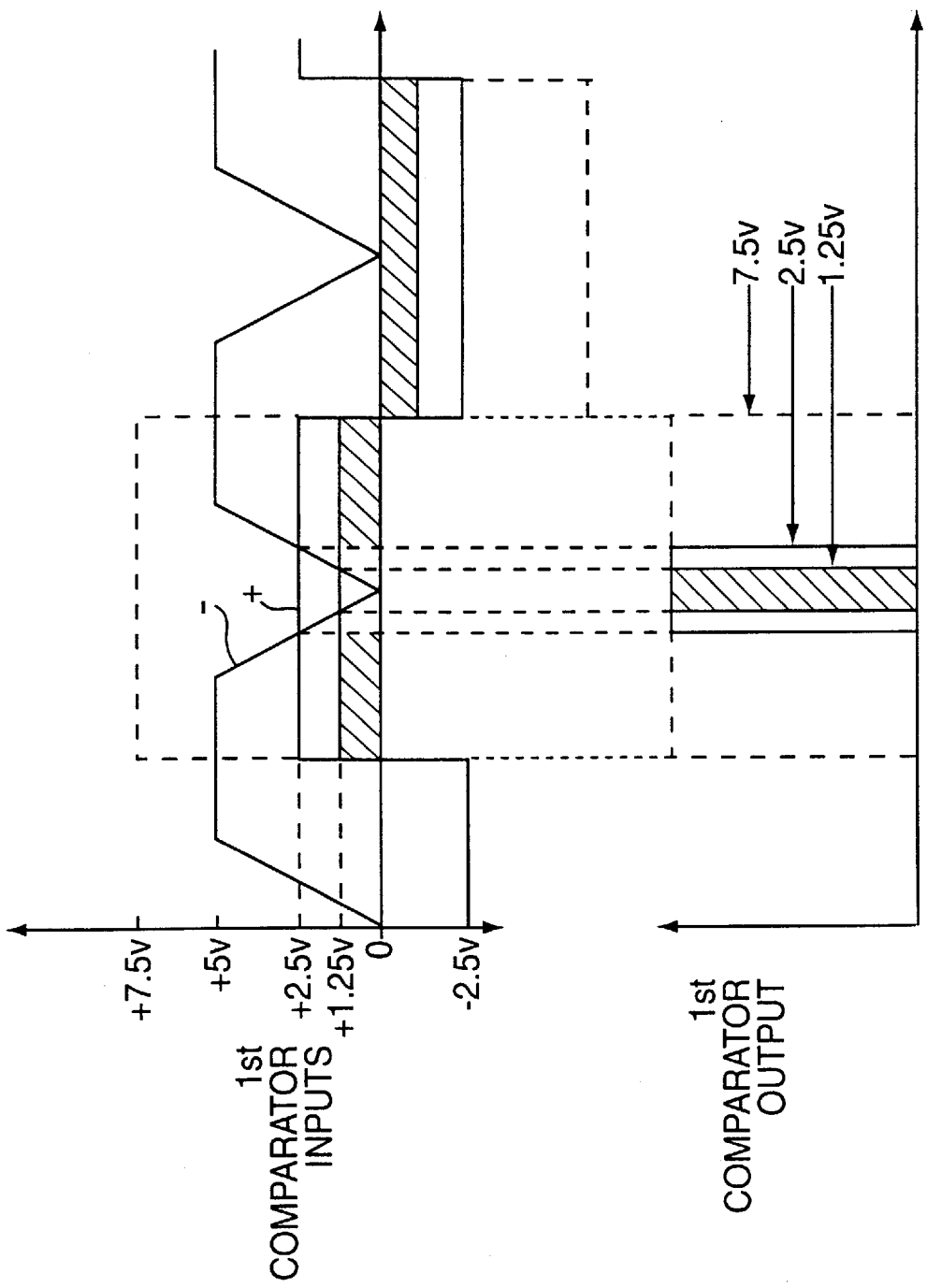

A functional block diagram of a circuit for controlling a permanent magnet motor is shown in FIG. 1 and representative waveforms of the signals occurring in the circuit are illustrated in FIGS. 2–4 and referenced in the text. An input source 10 provides a digital command signal (FIG. 2A). In this embodiment, a TTL square wave (e.g., 0–5 volts) of 400 Hz is utilized, but it should be understood that another frequency could have been selected. The 400 Hz signal is provided to one input of a phase comparator 20.

Figure 2A:
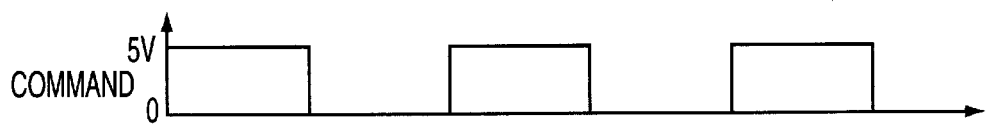
FIGS. 2–4 are waveform diagrams of the signals appearing in the circuit of FIG. 1.
Figure 2B:
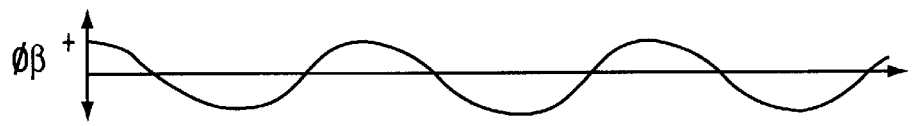
Figure 2C:
Figure 2D:

After processing as described further on, a drive signal ultimately reaches the $\phi A$ winding, creating a magnetic field in the winding. As the rotor of the motor turns, a back emf voltage is generated in the $\phi B$ winding (FIG. 2B). The schematic representation of the motor in the center of FIG. 1 shows that the $\phi A$ and $\phi B$ windings are oriented at 90° with respect to each other. Since the back emf voltage in the $\phi B$ winding will be compared with the square-wave command signal, a phase shifter 70 phase-shifts the back emf voltage by 90° and a squaring circuit 80 converts the phase-shifted back emf voltage to a TTL square wave (e.g., 0–5 volts) (FIGS. 2C and 2D). The resulting phase-shifted, square-wave is the feedback signal.

Figure 2E:
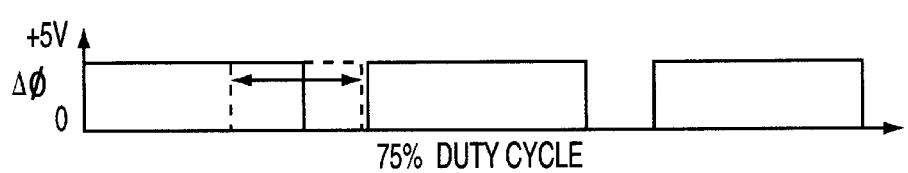

The square wave output of the squaring circuit 80 is provided to the other input of the phase comparator 20. The output of the phase comparator 20 is an error signal (FIG. 2E). When the frequency of the command input is greater than the frequency of the feedback input, during initial run-up, for example, the output of the phase comparator 20 is forced low; conversely, when the frequency of the command input is less than the frequency of the feedback input, the output of the phase comparator 20 goes high. When the frequencies of the command and feedback signals are equal, the output of the phase comparator 20 will be a square wave of the same frequency as the input signals having a duty cycle proportional to the phase difference of the input signals. When the phase of the feedback signal lags the phase of the command signal, the duty cycle will be less than 50%, but it will be greater than 50% when it leads the phase of the command signal.

Figure 2F:
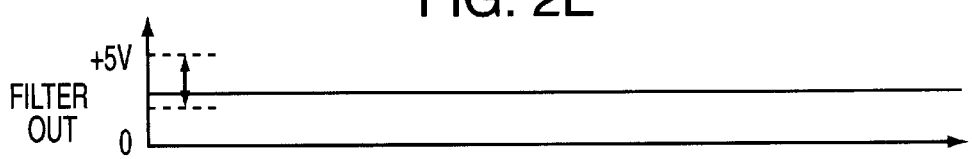

A filter 30 extracts the DC-component of the variable duty cycle 400 Hz signal appearing at the output of the phase comparator 20 (FIG. 2F). The following transfer function was successfully employed for the filter:

$$G=3/\{(s/300)^2+(2(0.5)s/300)+1\}$$

In this example, the quantity 300 represents the break frequency of the filter (in radians per second) and the quantity 0.5 is the damping ratio. The actual design of the filter and the transfer function employed will depend on the particular application and can be selected using principles well known in the art.

Figure 2G:
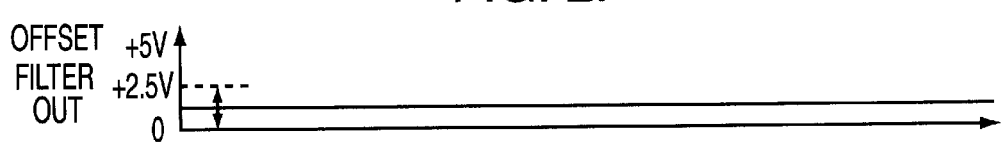

The DC error signal at the output of the filter 30 is level shifted in a level shift module 40 by the D.C. offset voltage (here arbitrarily selected to be 2.5 v.; one-half of the TTL voltage) to obtain zero output under in-phase conditions (i.e., 50% duty cycle in the output of the phase comparator 20) (FIG. 2G). A loop compensation module 50 following the level shift module 40 provides loop stability. The following transfer function for the loop compensation was used satisfactorily:

$$H=\{10([s/50]+1)\}/\{(s/1000)+1\}$$

It should be noted that although this particular function introduces a gain factor of 10 into the loop, the waveform diagrams accompanying this discussion do not precisely reflect such an increase. Additionally, the actual compensation factor employed will depend on the gain and phase dynamics of the loop and can be selected using principles well known in the art.

Figure 2H:
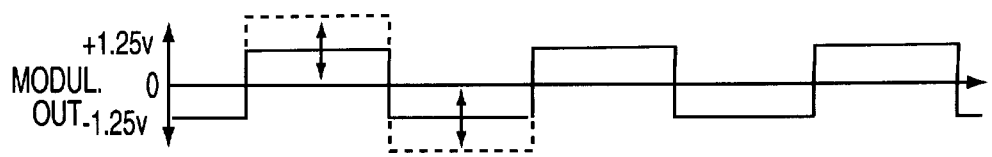

The compensated, level-shifted signal output of the compensation module 50 and the square wave output of the squaring circuit 80 are provided as inputs of a square-wave modulator or chopper 60. The output of the modulator 60 is an amplitude-modulated, suppressed-carrier, zero-average square wave (FIG. 2H).

The back emf voltage generated in the $\phi B$ winding is also provided directly to a second squaring circuit 90 (FIG. 3A). The back emf voltage is demodulated in a full-wave demodulator 100 switched by the output of the squaring circuit 90, creating a double frequency signal of negative, half-sine pulses (FIG. 3B). The peaks of the pulses are clipped and inverted by a high-gain linear amplifier 110, leaving relatively linear rising and falling edges (FIG. 3C). This can be achieved by operating the linear amplifier with gain sufficient to clip at the 45° point. A unity gain inverter 120 then generates an inverted counterpart of the output of the linear amplifier 110 (FIG. 3D). Alternatively, a second, non-inverting high-gain, linear amplifier could be employed to generate the inverted clipped pulse signal.

The clipped, positive and negative half-sine double-frequency pulses and the output of the modulator 60 are provided to a pulse-width modulation converter 130. The converter 130 has first and second comparators 132 and 134 and output blocking diodes 136 and 138. The positive and negative pulses are provided to the negative inputs of the first and second comparators 132 and 134, respectively, while the output of the square-wave modulator 60 is provided to the positive inputs of both comparators 132 and 134 (FIGS. 3E and 3G). The blocking diodes 136 and 138 assure that only the positive and negative outputs of the first and second comparators 132 and 134, respectively, arbitrarily designated $+V_p$ and $-V_p$, pass to a tristate switching amplifier 140 (FIGS. 3F and 3H).

The clipped signals from the linear amplifier 110 and the inverter 120 serve as sawtooth waveforms that will provide relative cutoff levels for the comparators. Since the loop is closed and therefore self-correcting, the linearity of the slopes of the clipped pulses is not critical.

The tristate switching amplifier 140 has three outputs: $+V_s$, $-V_s$, and open (FIG. 3I). When the tristate switching amplifier 140 receives a positive $+V_p$ pulse from the first comparator 132 through its corresponding blocking diode 136, it switches its output to $+V_s$. Conversely, a negative pulse input from the second comparator 134 will cause the tristate switching amplifier 140 to switch to $-V_s$. If neither comparator is providing a pulse to the tristate switching amplifier 140, then the tristate switching amplifier 140 will exhibit an open condition.

The positive pulse that drives the tristate switching amplifier 140 is shown specifically in FIG. 4. Because the square wave signal provided to the positive inputs of the comparators 132 and 134 and the half-sine pulses on the negative inputs are both derived from the same φB back emf signal and are displaced 90° with respect to each other, the midpoint of each half-cycle of the square wave signal (i.e., the 90° point) straddles the intersection of adjacent half-sine pulses at its 90° point, as illustrated in FIG. 4. Consequently, as the amplitude of the square wave signal varies, signifying a greater or lesser error signal resulting from a greater or lesser phase difference between the command and feedback signals, the widths of the positive and negative pulses appearing at the outputs of the comparators 132 and 134, respectively, vary symmetrically about the 90° and 270° points. As a result, the tristate output signal (FIG. 3I) is always in relative spatial phase with respect to the back emf signal (FIG. 3A), or 90° shifted, yielding optimum efficiency.

During run-up, the circuit will call for maximum drive. In such a case, the output of the tristate switching amplifier 140 will be driven to maximum duty cycle, arbitrarily shown in FIG. 4 as the 7.5-volt level. The loop compensation module 50 will minimize the effect of any discontinuity occurring as the amplitude of the square wave passes the peak amplitude of the clipped half-sine pulses.

While there has been described what is believed to be the preferred embodiment of the invention, those skilled in the art will recognize that other and further modifications may be made thereto without departing from the spirit of the invention, and it is intended to claim all such embodiments that fall within the true scope of the invention. Each of the blocks in the diagram can be implemented using discrete and/or integrated circuits well known to those skilled in the art. If desired, the circuit as a whole could be implemented using digital signal processing techniques or an application specific integrated circuit (ASIC).

What is claimed is:

1. An apparatus for driving a two winding permanent magnet motor in response to a command signal, comprising:

means for generating an alternating-polarity, variable duty-cycle, pulse width modulated drive signal for one of the windings, means for sensing the back-emf generated in the other of the windings, and means, responsive to the command signal and the means for sensing the back-emf, for varying the duty cycle of the drive signal, said means for varying the duty cycle comprising means for comparing the relative phases of the command signal and the back-emf signal, means for generating an amplitude-modulated, suppressed-carrier, square-wave signal in phase with the back-emf signal, where the amplitude modulation is proportional to the relative phase difference between the command signal and the back-emf signal; and means for converting the amplitude-modulated, suppressed-carrier, square-wave signal to alternating positive and negative pulses, where the width of each pulse is proportional to the amplitude of the corresponding phase of the square-wave signal, and the positive and negative pulses are in phase with the amplitude-modulated, suppressed-carrier, square-wave signal.

2. A method for driving a two-winding permanent magnet motor in response to a command signal, comprising the steps of:

generating an alternating-polarity, variable duty-cycle, pulse modulated drive signal for one of the windings, sensing the back-emf generated in the other of the windings; and in response to the command signal and the step of sensing the back, varying the duty cycle of the drive signal, the step of varying the drive signal comprising the steps of comparing the relative phases of the command signal and then back-emf signal;

generating an amplitude-modulated, suppressed carrier, square-wave signal in phase with the back-emf signal, where the amplitude modulation is proportional to the relative phase difference between the command signal and the back-emf signal; and converting the amplitude-modulated, suppressed carrier, square wave signal to alternating positive and negative pulses, where the width of each pulse is proportional to the amplitude of the corresponding phase of the square-wave signal, and the positive and negative pulses are in phase with the amplitude-modulated, suppressed-carrier, square-wave signal.

3. An apparatus for driving a two-winding permanent magnet motor in response to a command signal, comprising:

means for generating an alternating-polarity, variable duty-cycle, pulse-width modulated drive signal for one of the windings, said means including a tri-state switching amplifier for generating a tri-state drive signal one of whose states is zero;

means for sensing the back-emf generated in the other of the windings; and means, responsive to the command signal and the means for sensing the back-emf, for varying the duty cycle of the drive signal from said tri-state switching amplifier.

4. An apparatus in accordance with claim 3 wherein said means for varying the duty-cycle of the drive signal also includes means for determining the polarity of the drive signal from said tri-state switching amplifier.

5. An apparatus for driving a two-winding permanent magnet motor in response to a square-wave command signal, comprising:

a tristate switching amplifier for generating a variable duty-cycle, pulse-width modulated drive signal for one of the windings;

means for sensing the back-emf generated in the other of the windings;

a phase shifter for shifting the phase of the sensed back emf signal ninety degrees;

a squaring circuit for converting the output of the phase shifter to a square wave;

a phase comparator for comparing the phase of the square-wave command signal and the output of the squaring circuit;

a filter for extracting the DC-component from the output of the phase comparator;

means for shifting the level of the D.C. error signal;

a modulator for modulating the output of the squaring circuit with the output of the means for level shifting;

a full-wave demodulator responsive to the back-emf signal for generating half-sine pulses;

means, responsive to the output of the full-wave demodulator, for generating clipped, positive and negative half-sine pulses;

a first comparator for comparing the output of the modulator and the positive half-sine pulses and generating a positive pulse of variable width;

a second comparator for comparing the output of the modulator and the negative half-sine pulses and generating a negative pulse of variable width; and means for varying the duty cycle of the output of the tristate switching amplifier in response to the pulse widths of the outputs of the first and second comparators.

* * * * *